United States Patent
Westhues et al.

(10) Patent No.: US 11,403,712 B2
(45) Date of Patent: *Aug. 2, 2022

(54) METHODS AND SYSTEMS FOR INJURY SEGMENT DETERMINATION

(71) Applicant: STATE FARM MUTUAL AUTOMOBILE INSURANCE COMPANY, Bloomington, IL (US)

(72) Inventors: John Westhues, Normal, IL (US); Leann Dionesotes, Bloomington, IL (US); David Ruby, Normal, IL (US); John Dillard, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,099

(22) Filed: Oct. 13, 2020

(65) Prior Publication Data

US 2021/0027387 A1     Jan. 28, 2021

Related U.S. Application Data

(63) Continuation of application No. 16/411,539, filed on May 14, 2019, now Pat. No. 10,832,347.
(Continued)

(51) Int. Cl.
*G06Q 40/08* (2012.01)
*G06N 20/00* (2019.01)
*G07C 5/08* (2006.01)

(52) U.S. Cl.
CPC ............ *G06Q 40/08* (2013.01); *G06N 20/00* (2019.01); *G07C 5/0808* (2013.01); *G07C 5/0841* (2013.01)

(58) Field of Classification Search
USPC ............................................. 705/4
See application file for complete search history.

(56) References Cited

U.S. PATENT DOCUMENTS

| | | | | |
|---|---|---|---|---|
| 9,984,421 B2 * | 5/2018 | Blakeman | .............. | G06Q 40/08 |
| 2002/0035488 A1 * | 3/2002 | Aquila | .................. | G06Q 40/02 |
| | | | | 705/4 |

(Continued)

OTHER PUBLICATIONS

Predicting work-related disability and medical cost outcomes: A comparison of injury severity scoring methods Jeanne M. Sears, Laura Blanar, Stephen M. Bowman (Year: 2014).*

(Continued)

*Primary Examiner* — William E Rankins
(74) *Attorney, Agent, or Firm* — Marshall, Gerstein & Borun LLP; Randall G. Rueth

(57) ABSTRACT

A method of determining an injury segment includes training a machine learning model, receiving a loss report, analyzing the loss report using the trained model to determine a severity of an injury, determining, based on the severity of the injury, an injury segment, and storing, via a processor, an indication of the injury segment. A computer system includes a processor configured to train a machine learning model, receive a loss report, analyze the loss report using the trained model to determine the severity of an injury, determine an injury segment, and store an indication of the injury segment. A non-transitory computer readable medium containing program instructions that when executed cause a computer to train a machine learning model, receive a loss report, analyze the loss report using the trained model to determine the severity of an injury, determine an injury segment, and store an indication of the injury segment.

20 Claims, 5 Drawing Sheets

Related U.S. Application Data

(60) Provisional application No. 62/671,253, filed on May 14, 2018.

(56) References Cited

U.S. PATENT DOCUMENTS

| | | | | |
|---|---|---|---|---|
| 2004/0225535 | A1* | 11/2004 | Bond, Jr. | G06Q 40/02 705/4 |
| 2005/0021374 | A1* | 1/2005 | Allahyari | G06Q 40/08 705/400 |
| 2005/0060205 | A1* | 3/2005 | Woods | G06F 9/453 705/4 |
| 2014/0081675 | A1* | 3/2014 | Ives | G06Q 40/08 705/4 |
| 2014/0149144 | A1* | 5/2014 | Li | G06Q 10/10 705/4 |
| 2014/0278572 | A1* | 9/2014 | Mullen | G07C 5/008 705/4 |
| 2016/0071217 | A1* | 3/2016 | Edwards | G06Q 10/063116 705/4 |
| 2016/0171622 | A1* | 6/2016 | Perkins | G06V 20/10 705/4 |
| 2019/0005198 | A1* | 1/2019 | Richards | G06Q 10/10 |

OTHER PUBLICATIONS

Analysis of traffic injury severity: An application of non-parametric classification tree techniques Li-Yen Chang, Hsiu-Wen Wang (Year: 2006).*

Chang et al., Analysis of traffic injury severity: An application of non-parametric classification tree techniques, Accid. Anal. Prev., 38(5):1019-27 (2006).

Sears et al., Predicting work-related disability and medical cost outcomes: A comparison of injury severity scoring methods, Injury, 45(1):16-22 (2014).

* cited by examiner

METHODS AND SYSTEMS FOR INJURY SEGMENT DETERMINATION

CROSS-REFERENCE TO RELATED APPLICATION

This application is a Continuation of application Ser. No. 16/411,539, entitled METHODS AND SYSTEMS FOR SMART CLAIM ROUTING AND SMART CLAIM ASSIGNMENT, filed on May 14, 2019. Application Ser. No. 16/411,539 claims the benefit of U.S. Provisional Application 62/671,253, entitled METHOD AND SYSTEMS FOR SMART CLAIM ROUTING AND SMART CLAIM ASSIGNMENT, filed on May 14, 2018, which is incorporated herein by reference in its entirety.

FIELD OF INVENTION

This disclosure generally relates to smart claim routing and smart claim assignment. More specifically, the present disclosure is directed to training a machine learning model using historical claim data to determine a severity of an injury and a routing and/or assignment of the claim based on the severity.

BACKGROUND

In various applications a need exists to quickly and accurately assign and/or route vehicle insurance and/or injury claims to one or more claim handlers who are situated in one or more tiers. Traditionally, auto and/or injury claims are assigned to a default, or "catch all", pool of claims, wherein the claims may remain idle until such time that a claim handler reviews the claim and assigns it to an appropriate claim handling tier. Efforts to organize claims into proper filing categories have been attempted, but rely on customer input and self-categorization. Customers may be incentivized to assign higher-than-warranted severity to claims in order to result in faster processing times. Furthermore, no humans, regardless of skill level, are able to analyze the entirety of all claims filed historically in an insurer's course of business to facilitate assignment and/or routing of claims. No humans, regardless of skill level, are able to analyze all ancillary documents filed with claims (e.g., electronic medical records) in a tractable period of time.

Claim handlers are lacking in experience and may improperly assign or improperly route a loss report. The varied experience of claim handlers, and limited tooling, are problems in the prior art. For example, a policyholder may be involved in an accident, and may be injured. The policyholder may inform the insurer that the injury occurred, and provide the insurer with written and/or verbal documentation relating to the incident (e.g., the vehicle make and model, year, mileage, hospital name, general nature of injury, length of hospital stay, etc.). Next, an auto claim handler may manually review the provided information, and make a determination of severity based on the claim handler's experience. However, conventional systems are unable to sufficiently identify/formulate precise characterizations of loss without resort to unconscious biases, and are unable to properly weight all historical data in determining loss mitigation factors in order to produce assignments and routes of loss reports that may be quantified, repeated, and whose accuracy can thus be improved.

Furthermore, claim handlers lack the technical ability to analyze all past claims in a very short time (e.g., in microseconds). Claim handlers' lack of experience, cognitive bias, fatigue, etc. may lead them to make errors in judgment as to whether an injury is severe or not. Important facts, such as the presence of electronic medical records including unfamiliar jargon (e.g., "ischemia") may not be understood by claim handlers who lack a background in medicine. Arcane legal pleadings, such as complaints wherein the party identified in the loss report as the injured party is listed as a complainant or plaintiff, may not be understood by claim handlers. As such, a need exists for computerized methods and systems of automatically assigning and/or routing claims related to vehicle insurance and personal injury, wherein the methods and systems can be continuously trained on new data, operate around the clock, and predict results that are repeatable and quantifiable.

BRIEF SUMMARY

The present disclosure generally relates to systems and methods for smart claim routing and smart claim assignment. Embodiments of exemplary systems and computer-implemented methods are summarized below. The methods and systems summarized below may include additional, fewer, or alternate components, functionality, and/or actions, including those discussed elsewhere herein.

In one aspect, a computer-implemented method of determining an injury segment includes training, via a processor, a machine learning model using historical claim data to determine an injury claim severity; receiving, via a processor, an auto accident loss report; analyzing the loss report using the trained machine learning model to determine a severity of an injury; determining, based on the severity of the injury, an injury segment; and storing, via a processor, an indication of the injury segment.

In another aspect, a computer system configured to determine an injury segment includes one or more processors configured to train, via the one or more processors, a machine learning model using historical claim data to determine an injury claim severity; receive, via the one or more processors, an auto accident loss report; analyze the loss report using the trained machine learning model to determine a severity of an injury; determine, based on the severity of the injury, an injury segment; and store, via the one or more processors, an indication of the injury segment.

In yet another aspect, a non-transitory computer readable medium includes program instructions that when executed, cause a computer to train, via the one or more processors, a machine learning model using historical claim data to determine an injury claim severity; receive, via the one or more processors, an auto accident loss report; analyze the loss report using the trained machine learning model to determine a severity of an injury; determine, based on the severity of the injury, an injury segment; and store, via the one or more processors, an indication of the injury segment in association with the loss report.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
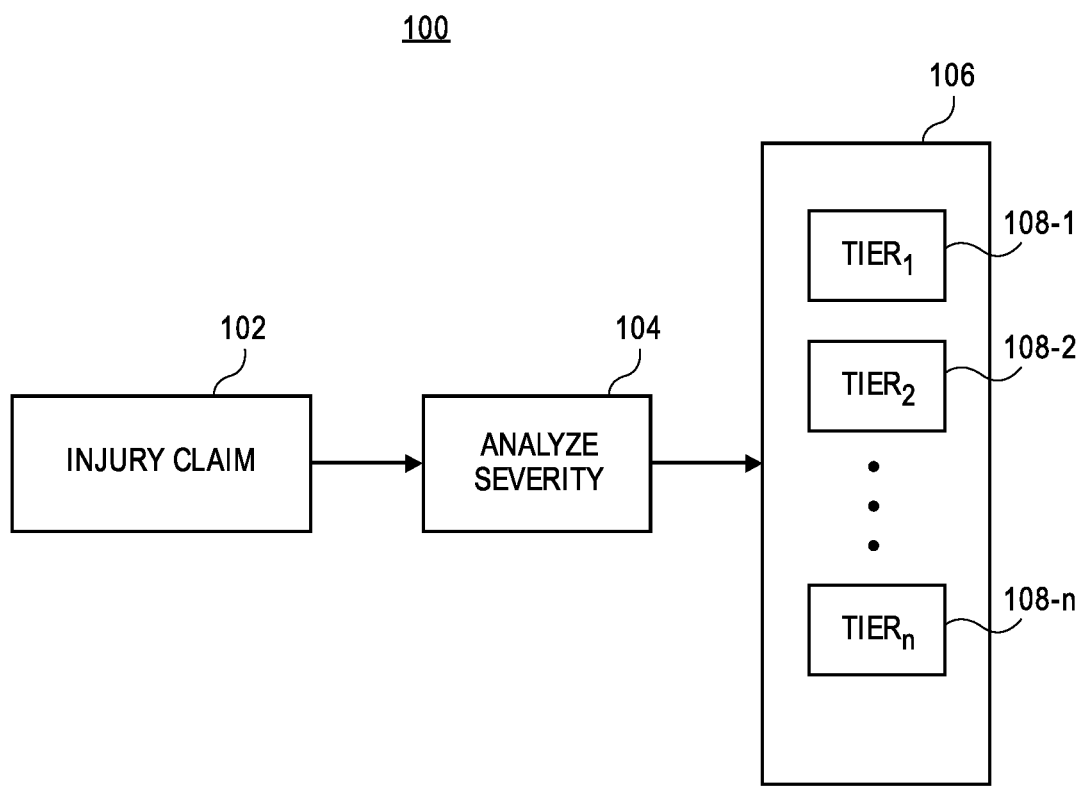
FIG. 1 depicts an environment for analyzing the severity of an injury claim and assigning and/or routing the claim to a set of tiers, according to an embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments are directed to, inter alia, machine learning techniques for training a machine learning (ML) model using historical automobile claim data to determine a routing and/or assignment for an auto insurance claim. Systems and methods may include natural language processing of free-form notes/text, or free-form speech/audio, recorded by call center and/or claim adjustor, photos, and/or other evidence. The free-form text and/or free-form speech may be received from a customer who is inputting the text and/or speech into a mobile device application, into a telephone system, and/or into a chat bot or robo-advisor.

Other inputs to a machine learning/training model may be harvested from historical claims, and may include make, model, year, miles, technological features, vehicle telematics, and/or other characteristics of a vehicle, whether a claim is paid or not paid, descriptions and/or accounts of injuries to vehicle operators, passengers, and/or third parties, liability (e.g., types of injuries, where treated, how treated, etc.), disbursements related to claim such as payment of medical bills, hotel costs and other payouts, etc. The present embodiments may dynamically characterize insurance claims, and/or dynamically classify, categorize, and/or measure the severity of an injury to an automobile operator, passenger, and/or third party. In general, herein, an "operator" may refer to a vehicle operator/driver, passenger, pedestrian, or any person within range of an automobile.

As noted above, the present embodiments may also be directed to machine learning and/or training a model using historical auto-related injury claim data to determine severity of injury, and routing claims accordingly. The present embodiments may include natural language processing of free-form notes recorded by call center and/or claim adjustor (e.g., "hit a deer", "broken leg", "collision", etc.), as well as photos, and/or other material to use as input to machine learning/training model. In an embodiment, a preexisting condition of a claimant may be considered in training the neural network. For example, claims in which the claimant has a heart condition, high blood pressure, diabetes or another condition may be labeled as higher priority claims. Inputs to the ML models may also include information relating to preexisting conditions, including information sourced from electronic medical records, wherein patients/policyholders have opted-in to the provision and analysis of such records.

Exemplary Environments for Training and/or Operating a Machine Learning Model to Route a Claim and/or Assign a Claim The embodiments described herein may relate to, inter alia, training and operating a machine learning model to route a claim and/or assign a claim. More particularly, in some embodiments, one or more ML models may be trained using historical claims data as training input. An application may be provided to a client computing device (e.g., a smartphone, tablet, laptop, desktop computing device, wearable, or other computing device) of a user. A user of the application, who may be an employee of a company employing the methods described herein or a customer of that company, may enter input into the application via a user interface or other means in the creation of a loss report and/or claim report. The input may be transmitted from the client computing device to a remote computing device (e.g., one or more servers) via a computer network, and then processed further, including by applying input entered into the client to the one or more trained ML models to produce outputs and weights indicating type and/or severity of injury. The type and/or severity of injury may be identified in electronic claim records, and/or may be predictive of certain real-world injuries. Although historical claims may be used in training one or more neural network models, electronic claims information may be streaming in realtime or with near-realtime latencies (e.g., on the order of 10 ms or less), in a dynamic process.

For example, an analysis engine may receive the input and determine, using a trained ML model, the input to determine one or more injury and/or a severity levels of the respective one or more injury. Herein severity levels may be expressed numerically, as strings (e.g., as labels), or in any other suitable format. Severity levels may be expressed as Boolean values (e.g., severe/not severe), scaled quantities (e.g., from 0.0-1.0), or in any other suitable format. The determined injury and/or severity levels may be displayed to the user, and/or may be provided as input to another application (e.g., to an application which uses the severity levels to assign a claim to one or more injury segment/tier or for other purposes).

Turning to FIG. 1, an environment 100 for analyzing the severity of an injury claim and assigning and/or routing the claim to a set of tiers is depicted, according to an embodiment. The environment 100 may include an injury claim 102, a severity analysis component 104, and a tier set 106. The tier set 106 may include a plurality of tiers 108-1 to 108-n, wherein n may be any integer. That is, any number of tiers may be present. In addition, in some embodiments, the tier set 106 may be a hierarchical set (e.g., a tree). For example, a first tier may correspond to a first set of sub-tiers, a second tier may correspond to a second set of sub-tiers, and so on. The injury claim 102 may be a loss report, which may be an electronic file defining information relating to a claimant/policy holder (e.g., name, address, telephone number, etc.), accident information (e.g., date, time, and location of loss), a diagram and/or photograph of the accident, a textual description of the circumstances of the injury, and information relating to any injured parties/operators. The severity analysis component 104 of environment 100 may include instructions for operating a trained machine learning (ML) model. For example, severity analysis component 104 may receive an injury claim and/or loss report, and may extract a set of discrete fields from the loss report. The fields may correspond to inputs of the trained ML model (e.g., a photograph, description, vehicle type, weather report, etc.). The severity analysis component 104 may input the fields into the trained ML model, and may receive an output from the trained ML model, in a blocking or non-blocking fashion. That is, the severity analysis component 104 may execute in a separate thread of an application or in a main thread of an application.

The trained ML model may output an indication of severity which may include a flat and/or hierarchical set of tiers and/or sub-tiers, or a numeric representation of severity. For example, the ML model may output a set of tiers a-z wherein tiers a-z may include any number of tiers, and wherein each tier represents a tier in tier set 106. This set of tiers may be an injury segment corresponding to one or more levels of customer service handling, wherein each level is responsible for handling progressively more severe claims. For example, a first tier may handle claims limited to minor property damage, a second tier may handle claims including property damage with an estimated repair value less than $1000, a third tier including property damage with an estimated repair value greater than $100 but less than $5000, and so forth. A tier in a-z may handle claims that include any combination of estimated repair values, and personal injury wherein the injured person was able to be treated on an outpatient basis. Another tier in a-z may handle injury claims wherein the injured person was treated on an inpatient basis for one day or less. Another tier may handle an injury wherein the injured person was treated for a week or les. Another tier may handle an injury in which a dismemberment, paralysis, and/or death occurred, and so on.

The ML model may be trained on, and may operate to assign/route claims to a set of tiers, based on an attributes of the claim other than the severity of one or more injuries. For example, an ML model may be trained which, in addition to or alternate to examination of claim injury severity, analyzes historical claims to determine the likelihood that an attorney or other representative will represent an injured party. An ML model may be trained on historical claims to determine the likelihood that an injury claim will result in the institution of a legal or quasi-legal proceeding (e.g., the filing of a lawsuit or other litigation, the receipt of demand letter, the convening of an arbitration proceeding, etc.). Separate tiers may exist for handling claims including, or likely to include, any of the foregoing legal or quasi-legal proceedings, and the ML model may be trained to output an assignment to one or more of the tiers.

Figure 2:
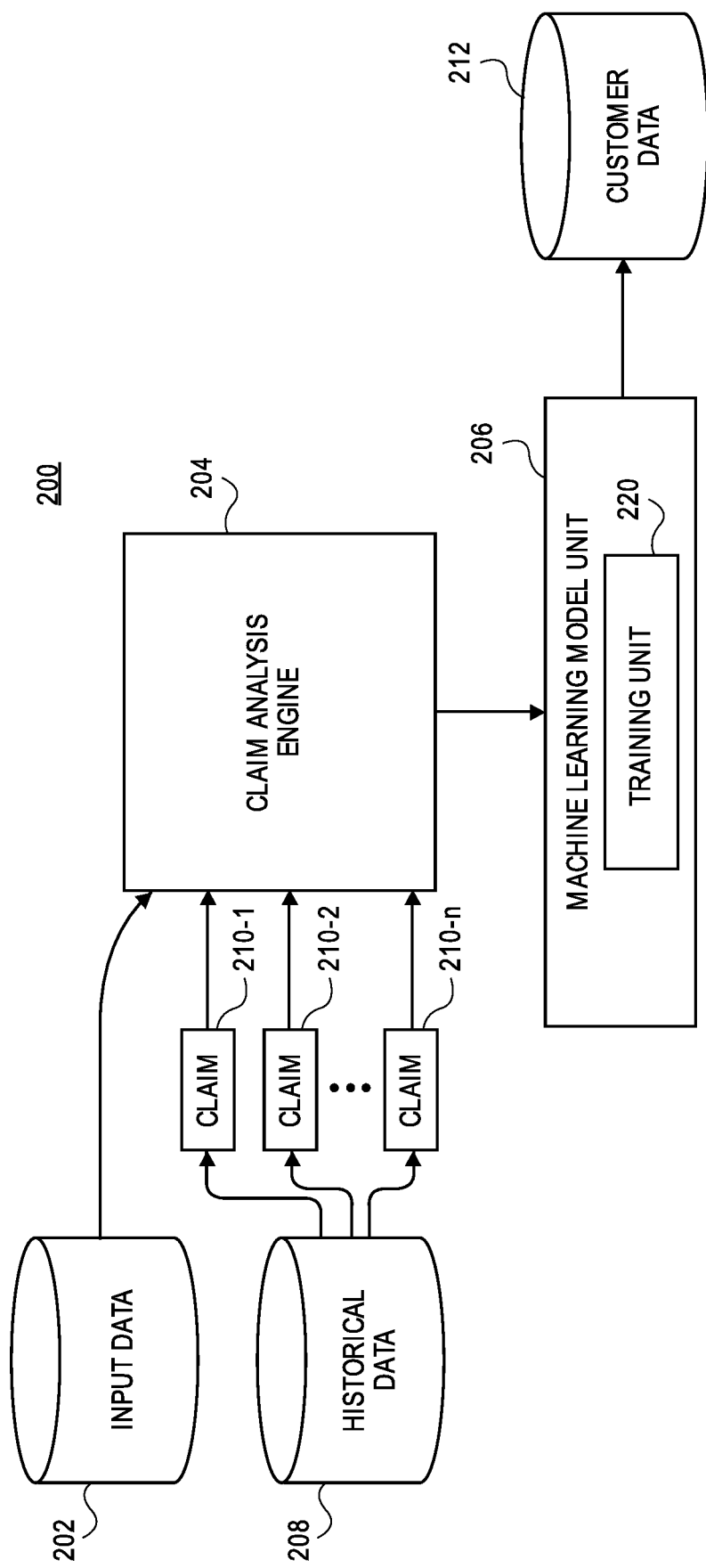
FIG. 2 depicts an environment for training a machine learning model to analyze the severity of an injury claim and assign and/or route the claim, as depicted in FIG. 1, according to one embodiment.

FIG. 2 depicts an environment 200 for training a machine learning model to analyze the severity of an injury claim and assign and/or route the claim, as depicted in FIG. 1, according to one embodiment. The environment 200 may include an input data 202 and a claim analysis engine 204. The environment 200 may include a machine learning model unit 206 and an historical data 208 including one or more claims 210-1 through 210-n. Machine learning (ML) model unit 206 may further include a training unit 220, and may environment 200 may include a customer data 212. The input data 202 may correspond to the injury claim 102 of FIG. 1, and may comprise one or more loss reports, as well as demographic information of a customer and/or another operator (e.g., name, age, driver's license, etc.). Photographs and descriptions of an accident may be included in input data 202. The input data 202 may be embodied in any suitable data storage device including, without limitation, a flat file, an electronic database (e.g., a structured query language (SQL) database, no-SQL database, etc.). The input data 202 may be stored/transmitted in a memory, including in a random access memory (RAM) or via a message queue as part of a distributed computing system. The claim analysis engine 204 may be embodied in a client computing device and/or server computing device, as discussed below. The claim analysis engine 204 may include instructions for parsing and/or otherwise massaging data received from the input data 202, as well as instructions for querying the input data 202. The claim analysis engine 204 may include instructions for operating a ML model trained by ML model unit 206, and for performing various actions based on the output of such trained ML model(s).

Input data 202 and historical data 108 may each comprise a plurality (e.g., thousands or millions) of electronic documents, or other information. As used herein, the term "data" generally refers to information related to a vehicle operator, which exists in the environment 200. For example, data may include an electronic document representing a vehicle (e.g., automobile, truck, boat, motorcycle, etc.) insurance claim, demographic information about the vehicle operator and/or information related to the type of vehicle or vehicles being operated by the vehicle operator, and/or other information. Data may be historical or current. Although data may be related to an ongoing claim filed by a vehicle operator, in some embodiments, data may consist of raw data parameters entered by a human user of the environment 200 or which is retrieved/received from another computing system. Data may or may not relate to the claims filing process, and while some of the examples described herein refer to auto insurance claims, it should be appreciated that the techniques described herein may be applicable to other types of electronic documents, in other domains. For example, the techniques herein may be applicable to assigning and/or routing claims related to homeowners insurance, agricultural insurance, health or life insurance, renters insurance, etc. In that case, the scope and content of the data may differ, in addition to the domain-specific training and operational requirements applicable to trained ML models. Generally, data may comprise any digital information, from any source, created at any time.

The ML model unit may train ML models for analyzing claims to build one or more ML models. The ML models may be trained to accept a plurality of inputs, which may include inputs in the input data 202 and from other sources. For example, in some embodiments, customer data may be retrieved/received from customer data 212, and may be input into trained ML models, as described below. In general, the ML model unit 206 may operate ML models and training unit 220 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the trained ML model may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible. In an embodiment, the input layer may correspond to input parameters that are numerical facts, such as the age and/or number of years of work experience of a person, or to other types of data such as data from the loss report. The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output. For example, a neuron may correspond to one of the neurons in the hidden layers. Each of the inputs to the neuron may be weighted according to a set of weights $W_1$ through $W_i$, determined during the training process (for example, if the neural network is a recurrent neural network) and then applied to a node that performs an operation α. The operation α may include computing a sum, a difference, a multiple, or a different operation. In some embodiments weights are not determined for some inputs. In some embodiments, neurons of weight below a threshold value may be discarded/ignored. The sum of the weighted inputs, $r_1$, may be input to a function which may represent any suitable functional operation on $r_1$. The output of the function may be provided to a number of neurons of a subsequent layer or as an output of the ANN.

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium. A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs. Additionally or alternatively, the machine learning programs may be trained by inputting sample data sets or certain data into the programs, such as drone, autonomous or semi-autonomous drone, image, mobile device, vehicle telematics, smart or autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ML model unit 206 and training unit 220 may be used to train multiple ML models relating to different granular segments of vehicle operators. For example, training unit 220 may be used to train an ML model for analyzing injuries in motorcycle operators of a certain age range. In another embodiment, training unit 220 may be used to train an ML model for use in predicting an appropriate tier assignment/routing for operators in a particular state or locality. ML model unit 206 may train one or more artificial neural network, or simply "neural network." The neural network may be any suitable type of neural network, including, without limitation, a recurrent neural network or feedforward neural network. The neural network may include any number (e.g., thousands) of nodes or "neurons" arranged in multiple layers, with each neuron processing one or more inputs to generate a decision or other output. In some embodiments, neural network models may be chained together, so that output from one model is fed into another model as input. For example, claim analysis engine 204 may, in one embodiment, apply input data 202 to a first neural network model that is trained to generate determine whether claims include an injury. The output of this first neural network model may be fed as input to a second neural network model which has been trained to predict severity of claims based upon the severity indicia discussed herein. Training unit 220 may train an ANN to identify injury claims by accessing electronic claims within historical data 208. Historical data 208 may comprise a corpus of documents comprising many (e.g., millions) of insurance claims which may contain data linking a particular customer or claimant to one or more vehicles, and which may also contain, or be linked to, information pertaining to the customer. The neural network may identify one or more insurance types associated with the one or more portions of input data 202 (e.g., bodily injury, property damage, collision coverage, comprehensive coverage, liability insurance, med pay, or personal injury protection (PIP) insurance). In one embodiment, the one or more insurance types may be identified by training the neural network based upon types of peril. For example, the neural network model may be trained to determine a car accident involving damage to a non-covered vehicle may indicate liability insurance coverage.

The claim analysis engine 204 and/or the ML model unit 206 may include instructions for receiving and/or retrieving information from the historical data 208. The historical data 208 may include one or more electronic databases (e.g., SQL or no-SQL databases) and/or flat file data sources which may contain historical claim data. Historical claim data may include claim data scanned or entered into a digital format by a human or by an automated process (e.g., via a scanner) from paper sources/files and/or electronic claim data. In an embodiment, retrieving/receiving information from the historical data 208 may include performing optical character recognition techniques on textual data stored in image file formats, and/or performing natural language processing techniques on data stored in audio file formats. In some embodiments, claim analysis engine 204 may determine facts regarding claim inputs (e.g., the amount of money paid under a claim). Amounts may be determined in a currency- and inflation-neutral manner, so that claim loss amounts may be directly compared. In some embodiments, claim analysis unit 204 may search textual claim data for specific strings or keywords in text (e.g., "hospital", "ambulance", etc.) which may be indicative of particular injuries. In some embodiments, text analysis may include text processing algorithms (e.g., lexers and parsers, regular expressions, etc.) and may emit structured text in a format which may be consumed by other components. Standard natural language processing techniques may be used to identify, for example, entities or concepts that may be indicative of injury (e.g., that an injury occurred to a person, and that the person's leg was injured, that the person was taken via ambulance to a hospital, etc.).

Claim analysis engine 204 and ML model unit 206 may analyze one or more claims. Specifically, the historical data 208 may include a set of claims, and a subset of claims may be retrieved from the historical data 208 according to any query strategy. For example, claims 210-1 through 210-*n* may be retrieved by claim analysis engine 204, wherein claims 210-1 through 210-*n* correspond to claims in a certain time period, involving a particular vehicle type/classification (e.g., by vehicle make/model), wherein a particular type of injury was present, etc. Any number of claims may be stored in the historical data 208; i.e., n may be any positive integer. The historical data 208 may include claims labeled by severity, wherein (for example) a severity level is assigned to each claim on a scale from 0.0-1.0, with 1.0 being the most severe claim severity level. The historical claim data 208 may then be queried to retrieve claims having a severity within a particular range. In an embodiment, retrieving/ receiving information from the historical data 208 may include analyzing image and/or video data to extract information (e.g., to identify damage and/or injury). For example, in an embodiment, instructions executing in claim analysis engine 204 may analyze a claim in claim 210-1 thorough 210-*n* to determine whether the claim includes an image of a damaged vehicle. A damage score may be assigned to the damaged vehicle indicating the severity of damage to the vehicle. Each of the claims 210-1 through 210-*n* may include an indication of whether an attorney and/or another party represents a claimant/operator relating to each respective claim, in addition to information relating to any legal or quasi-legal proceedings pending and/or settled. In an embodiment, the training process may be performed in parallel, and ML training unit 220 may analyze all or a subset of claims 210-1 through 210-*n*. Claim records 110-1 through 110-*n* may be organized in a flat list structure, in a hierarchical tree structure, or by means of any other suitable data structure. For example, the claim records may be arranged in a tree wherein each branch of the tree is representative of one or more customer. There, each of claim records 210-1 through 210-*n* may represent a single non-branching claim, or may represent multiple claim records arranged in a group or tree. Further, claim records 210-1 through 210-*n* may comprise links to customers and vehicles whose corresponding data is located elsewhere. In this way, one or more claims may be associated with one or more customers and one or more vehicles via one-to-many and/or many-to-one relationships. The status of claim records may be completely settled or in various stages of settlement.

As noted, the customer data 212 may include information relating to an operator/policy holder, such as demographic information (e.g., name, address, telephone number, etc.). The customer data 212 may also include information relating to vehicles owned/operated by the operator/policy holder, as well as detailed information relating to any insurance policy and related coverages. For example, the customer data 212 may include a list of a collision, comprehensive, and/or liability auto insurance policy of a claimant. The customer data 212 may include demographic and policy information corresponding to claims included in the historical data 208 and/or current customers, whose data may be included in the input data 202. In this way, the claim analysis engine 204 may combine and/or correlate (e.g., by performing an SQL JOIN operation) the input data 202, the historical data 208, and or the customer data 212; including any possible subsets thereof.

As used herein, the term "claim" or "vehicle claim" generally refers to an electronic document, record, or file, that represents an insurance claim (e.g., an automobile insurance claim) submitted by a policy holder of an insurance company. Herein, "claim data" or "historical data" generally refers to data directly entered by the customer or insurance company including, without limitation, free-form text notes, photographs, audio recordings, written records, receipts (e.g., hotel and rental car), and other information including data from legacy, including pre-Internet (e.g., paper file), systems. Notes from claim adjusters and attorneys may also be included. Claim data may include data entered by third parties, such as information from a repair shop, hospital, doctor, police report, etc.

In one embodiment, claim data may include claim metadata or external data, which generally refers to data pertaining to the claim that may be derived from claim data or which otherwise describes, or is related to, the claim but may not be part of the electronic claim record. Claim metadata may have been generated directly by a developer of the environment 200, for example, or may have been automatically generated as a direct product or byproduct of a process carried out in the environment 200. For example, claim metadata may include a field indicating whether a claim was settled or not settled, and amount of any payouts, and the identity of corresponding payees.

Another example of claim metadata is the geographic location in which a claim is submitted, which may be obtained via a global positioning system (GPS) sensor in a device used by the person or entity submitting the claim. Yet another example of claim metadata includes a category of the claim type (e.g., collision, liability, uninsured or under-insured motorist, etc.). For example, a single claim in the historical data 208 may be associated with a married couple, and may include the name, address, and other demographic information relating to the couple. Additionally, the claim may be associated with multiple vehicles owned or leased by the couple, and may contain information pertaining to those vehicles including without limitation, the vehicles' make, model, year, condition, mileage, etc. The claim may include a plurality of claim data and claim metadata, including metadata indicating a relationship or linkage to other claims in the historical claim data 208.

Once the ML model has been trained, the claim analysis engine 204 may apply the trained neural network to the input data 202. In one embodiment, the input data 202 may merely "pass through" without modification. The output of the ML model, indicating tier and/or injury segments, and/or severity levels, may be provided to another component, stored in an electronic database, etc. In some embodiments, determining a single label may require a trained ML model to analyze several attributes within the input data 202. And in some embodiments, multiple injuries in the input data 202 may be assigned to multiple different (or same) respective tiers. The respective tiers may correspond to tier 108-1 through tier 108-$n$ of FIG. 1. In addition, the ML model may include instructions for classification of one or more respective detected injuries into one or more non-overlapping sets of injury segments/tiers. For example, an injury to a driver may be assigned to tier a, b, and c whereas an injury to a passenger may be assigned to tiers x, y, and z. Either a strict assignment, to one or more tiers, or a routing, may be output by the ML model. For example, an ML model may output a set {x}, wherein x is a single tier to which a particular claim is assigned. In an embodiment, an ML model may output a set with multiple members. In yet another embodiment, an ML model may output a routing, wherein a claim will be routed from one tier and/or injury segment to another, throughout the life of the claim (e.g., {x→y→z}, wherein the claim will first be assigned to tier x, then to tier y, then finally to tier z. A routing may be created by ordering an output of the ML model recommending multiple tiers, from greatest to least confidence, in an embodiment. The routing may also be determined by analyzing the claim volume and relative backlog of each of a set of tiers, and factoring both the confidence and backlog into the routing decision.

Exemplary Model Training System

Figure 3:
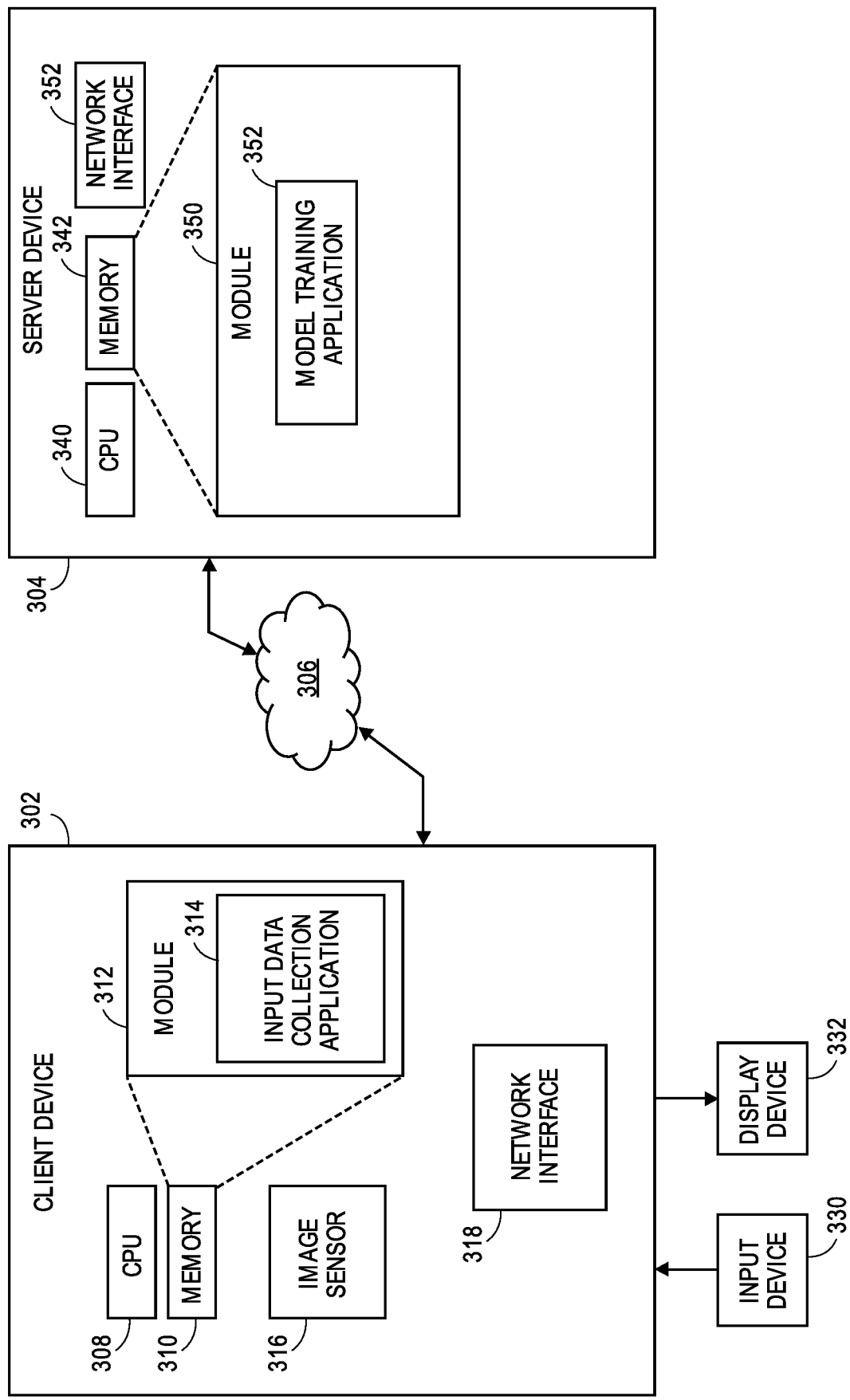
FIG. 3 depicts an example environment for analyzing the severity of an injury claim and assigning and/or routing the claim to a set of tiers as depicted in FIG. 1, and/or training a machine learning model as depicted in FIG. 2, according to one embodiment and scenario.

FIG. 3 depicts a high-level block diagram of a claim assignment and/or claim routing model training/use environment 300 which may facilitate the training and use of ML models, according to an embodiment. FIG. 3 may correspond to one embodiment of the environment 100 of FIG. 1 and/or FIG. 2, and also includes various user/client-side components. The environment 300 may include a client device 302 and a server device 304. Either the client device 302 and/or server device 304 may be any suitable computing device (e.g., a laptop, smart phone, tablet, server, wearable device, etc.). Server 304 may host services relating to ML model training and operation, and may be communicatively coupled to client device 302 via a network 306.

Although only one client device is depicted in FIG. 3, it should be understood that any number of client devices 302 may be supported. The client device 302 may include a central processing unit (CPU) 308 and a memory 310 for storing and executing, respectively, a module 312. While referred to in the singular, the CPU 308 may include any suitable number of processors of one or more types (e.g., one or more CPUs, graphics processing units (GPUs), cores, etc.). Similarly, the memory 310 may include one or more persistent memories (e.g., a hard drive and/or solid state memory). The module 312, stored in the memory 310 as a set of computer-readable instructions, may be related to an input data collection application 314 which, when executed by the CPU 308, causes input data to be stored in the memory 310. The data stored in the memory 310 may correspond to, for example, raw data retrieved from the injury claim 102, the input data 202, and/or the claim 210-1 through 210-$n$. The input data collection application 314 may be implemented as web page (e.g., HTML, JavaScript, CSS, etc.) and/or as a mobile application for use on a standard mobile computing platform. The input data collection application 314 may store information in the memory 310, including the instructions required for the execution of the input data collection application 314 execution. While the user is using the input data collection application 314, scripts and other instructions comprising the input data collection application 314 may be represented in the memory 208 as a web or mobile application. The input data collected by the input data collection application 314 may transmitted to the server device 304 by a network interface 318 via network 306, where the input data may be processed as described above to determine a set of one or more tier and/or injury segment.

The client device 302 may also include a GPS sensor, an image sensor, a user input device 330 (e.g., a keyboard, mouse, touchpad, and/or other input peripheral device), and display interface 332 (e.g., an LED screen). The user input device 330 may include components that are integral to the client device 302, and/or exterior components that are communicatively coupled to the client device 302, to enable the client device 302 to accept inputs from the user. The display 332 may be either integral or external to the client device 302, and may employ any suitable display technology. In some embodiments, the input device 330 and the display device 332 are integrated, such as in a touchscreen display. Execution of the module 312 may further cause the processor 308 to associate device data collected from client 302 such as a time, date, and/or sensor data (e.g., a camera for photographic or video data) with vehicle and/or customer data, such as data retrieved from customer data 212. The customer data 212 may be geographically distributed, and may be located within separate remote servers or any other suitable computing devices. Distributed database techniques (e.g., sharding and/or partitioning) may be used to distribute data. In one embodiment, a free or open source software framework such as Apache Hadoop® may be used to distribute data and run applications. It should also be appreciated that different security needs, including those mandated by laws and government regulations, may in some cases affect the embodiment chosen, and configuration of services and components.

In some embodiments, the client device 302 may receive data generated by ML model unit 206, and may display such data in the display device 332, and/or may use the data to perform a computation (e.g., an application executing in the module 314 may analyze the data to assign and/or route a claim to a tier and/or injury segment). Execution of the module 312 may further cause the CPU 310 communicate with the CPU 340 of the server device 304 via the network interface 318 and the network 306. As an example, an application related to module 312, such as input data collection application 314, may, when executed by the CPU 308, cause a user interface to be displayed to a user of client device 302 via display interface 332. The application may include graphical user input (GUI) components for acquiring data (e.g., photographs, text, and/or other components of a loss report) from image sensor 316, the GPS sensor, and textual user input from user input device(s) 330. The CPU 308 may transmit the aforementioned acquired data to the server device 304, and the CPU 352 may pass the acquired data to an ML model, which may accept the acquired data and perform a computation (e.g., training of the model, or application of the acquired data to a trained ML model to obtain a result). With specific reference to FIG. 3, the data acquired by the client device 302 may be transmitted via the network 306 to a server device implementing severity analysis component 104 and/or claim analysis engine 204, where the data may be processed before being applied to a trained ML model by machine learning model unit 206. The output of the trained ML model may be transmitted back to client 302 for display (e.g., in display device 332) and/or for further processing. The network interface 318 may be configured to facilitate communications between the client device 302 and the server device 304 via any hardwired or wireless communication network, including network 306 which may be a single communication network, or may include multiple communication networks of one or more types (e.g., one or more wired and/or wireless local area networks (LANs), and/or one or more wired and/or wireless wide area networks (WANs) such as the Internet). The client device 302 and/or the server device 304 may be communicatively coupled to one or more databases, such as customer data 212 of FIG. 2.

The client device 302 may be, in some embodiments, a client device corresponding to one or more of tier set 106. That is, in some embodiments, each tier in tier 108-1 through tier 108-$n$ of FIG. 1 may include one or more client devices 302. The module 312 and/or the module 350 may dispatch a claim to one of these client devices 302 belonging to tier 108-1 through 108-$n$ in response to an action or event, such as an output being generated by the trained ML model. In another embodiment, the output of the trained ML model may identify one or more tier in tier set 106, and the module 350 may assign that one or more tier to the claim being analyzed, and store an association of the analyzed claim and the tier set in an electronic database communicatively coupled to the server device 304.

The server device 304 may include a CPU 340 and a memory 342 for executing and storing, respectively, a module 350. The module 350, stored in memory 342 as a set of computer-readable instructions, may facilitate applications related to assigning and/or routing of insurance claims, including injury data, claim data and claim metadata, and insurance policy data. The model 350 may also include an ML model training application and/or set of instructions, which may correspond to ML training unit 206 and/or training unit 220 of FIG. 2. The model 350 may include a set of instructions for receiving/retrieving claims and/or input data, which may correspond to claim analysis engine 204 of FIG. 2. The model training application 352 may be implemented in any suitable technology, including a set of computer instructions for training ML models. For example, instructions included in module 350 may cause CPU 340 to read data from the historical data 208, which may be communicatively coupled to the server device 304, either directly or via communication network 306. The CPU 340 may include instructions for analyzing of a series of electronic claim documents from historical data 270, as described above with respect to claims 210-1 through 210-$n$ of historical data 208 of FIG. 2. Processor 340 may query customer data 121 for data related to respective electronic claim documents and raw data, as described with respect to FIG. 1 and FIG. 2. Module 350 may also facilitate communication between client device 302 and server device 304 via network interface 352 and network 306. Although only a single server device 304 is depicted in FIG. 3, it should be appreciated that it may be advantageous in some embodiments to provision multiple server devices 304 for the deployment and functioning of the environment 300. For example, the claim analysis unit 204 of FIG. 2 may require CPU-intensive processing. Therefore, deploying additional hardware may provide additional execution speed.

In a manner similar to that discussed above in connection with FIG. 2, historical claims may be ingested by server device 304 and used by model training application 352 to train an ML model. Then, when module 350 processes input from client device 302, the data output by the ML model(s) (e.g., data indicating severity, tiers, confidence labels, injury segments, injuries, etc.) may be passed to other components, and used for further processing by the other components. It should be appreciated that the client/server configuration depicted and described with respect to FIG. 3 is but one possible embodiment. In some cases, a client device such as client device 302 may not be used. In that case, input data may be entered—programmatically, or manually—directly into server device 304. A computer program or human may perform such data entry. In that case, device may contain additional or fewer components, including input device(s) and/or display device(s).

In operation, a user of the client device 302, by operating the input device 330 and viewing the input display 224, may open input data collection application 314, which depending on the embodiment, may allow the user to enter personal information. The user may be an employee of a company owner/proprietor of the methods and systems disclosed herein, or a customer/end user of the company. For example, input data collection application 314 may walk the user through the steps of submitting a loss report. Before the user can fully access input data collection application 314, the user may be required to authenticate (e.g., enter a valid username and password). The user may then utilize the input data collection application 314. The module 312 may contain instructions that identify the user and cause the input data collection application 314 to present a particular set of questions or prompts for input to the user, based upon any information the input data collection application 314 collects, including without limitation information about the user or any vehicle. Further, the module 312 may identify a subset of historical data 208 to be used in training a ML model, and/or may indicate to server device 314 that the use of a particular ML model or models is appropriate. For example, if the user is completing a loss report and selects that a personal injury was sustained, then the module 312 may transmit the user's name and personal information, the location of the user as provided by the GPS module, a photograph of the damaged vehicle captured by the image sensor 316, a description of the injury, and the make, model, and year of the vehicle to the server device 304.

In some embodiments, location data from the client device 302 may be provided to the module 350, and the module 350 may select an ML model to operate based on the location. For example, the zip code of a vehicle operator, whether provided via GPS or entered manually by a user, may cause the module 350 to select an ML model corresponding to claims in a particular state, or an ML model corresponding to urban claim filers.

By the time the user of the client device 302 submits a loss report and/or files a claim, the server device 304 may have already processed the electronic claim records in historical data 208 and trained one or more ML model to analyze the information provided by the user to output tier indications, injury segment indications, and/or weights. For example, the operator of a 2018 Chevrolet Camaro may access the client device 302 to submit a loss report under the driver's collision insurance policy related to damage to the vehicle sustained when the driver was rear-ended at a red light. The client 302 may collect information from the vehicle operator related to the circumstances of the collision, in addition to demographic information of the vehicle operator, including location and photographs from the GPS module and image sensor 316, respectively. In some embodiments, the vehicle operator may be prompted to make and/or receive a telephone call to discuss the filing of the claim/loss report.

All of the information collected may be associated with a claim identification number so that it may be referenced as a whole. The server device 304 may process the information as it arrives, and thus may process information collected by input data collection application 314 at a different time than the server device 304 processes other input. Once information sufficient to process the claim has been collected, server device 304 may pass all of the processed information to module 350, which may apply the information to the trained ML model. While the loss report is pending, the client device 302 may display an indication that the processing of the claim is ongoing and/or incomplete. When the claim is ultimately processed by the server 304, an indication of completeness may be transmitted to the client 302 and displayed to user, for example via the display device 332. Missing information may cause the ML model to abort with an error.

In one embodiment, the settlement of a claim may trigger an immediate update of one or more neural network models included in the AI platform. For example, the settlement of a claim involving personal injury that occurs in California may trigger updates to a set of personal injury ML models pertaining to collision coverage in that State. In addition, or alternatively, as new claims are filed and processed, the weights of existing models may be updated, based on online training using the new claims. In some embodiments, a human reviewer or team of reviewers may be responsible for approving tier and/or injury segment assignments and/or routings before any associated outputs/predictions are used.

While FIG. 3 depicts a particular embodiment, the various components of environment 300 may interoperate in a manner that is different from that described above, and/or the environment 200 may include additional components not shown in FIG. 2. For example, an additional server/platform may act as an interface between the client device 302 and the server device 304, and may perform various operations associated with providing the assignment and/or routing information.

Exemplary Claim Processing

The specific manner in which the one or more ML models employ machine learning to determine the best tier(s) into which to classify injuries relating to loss reports may differ depending on the content and arrangement of training documents within the historical data and the input data provided by customers or users of environment 100, environment 200, and environment 300; as well as the data that is joined to the historical data and input data, such as customer data 212. The initial structure of the ML models may also affect the manner in which the trained ML models process the input and claims. The output produced by ML models may be counter-intuitive and very complex. For illustrative purposes, intuitive and simplified examples will now be discussed in connection with FIG. 4.

Figure 4:
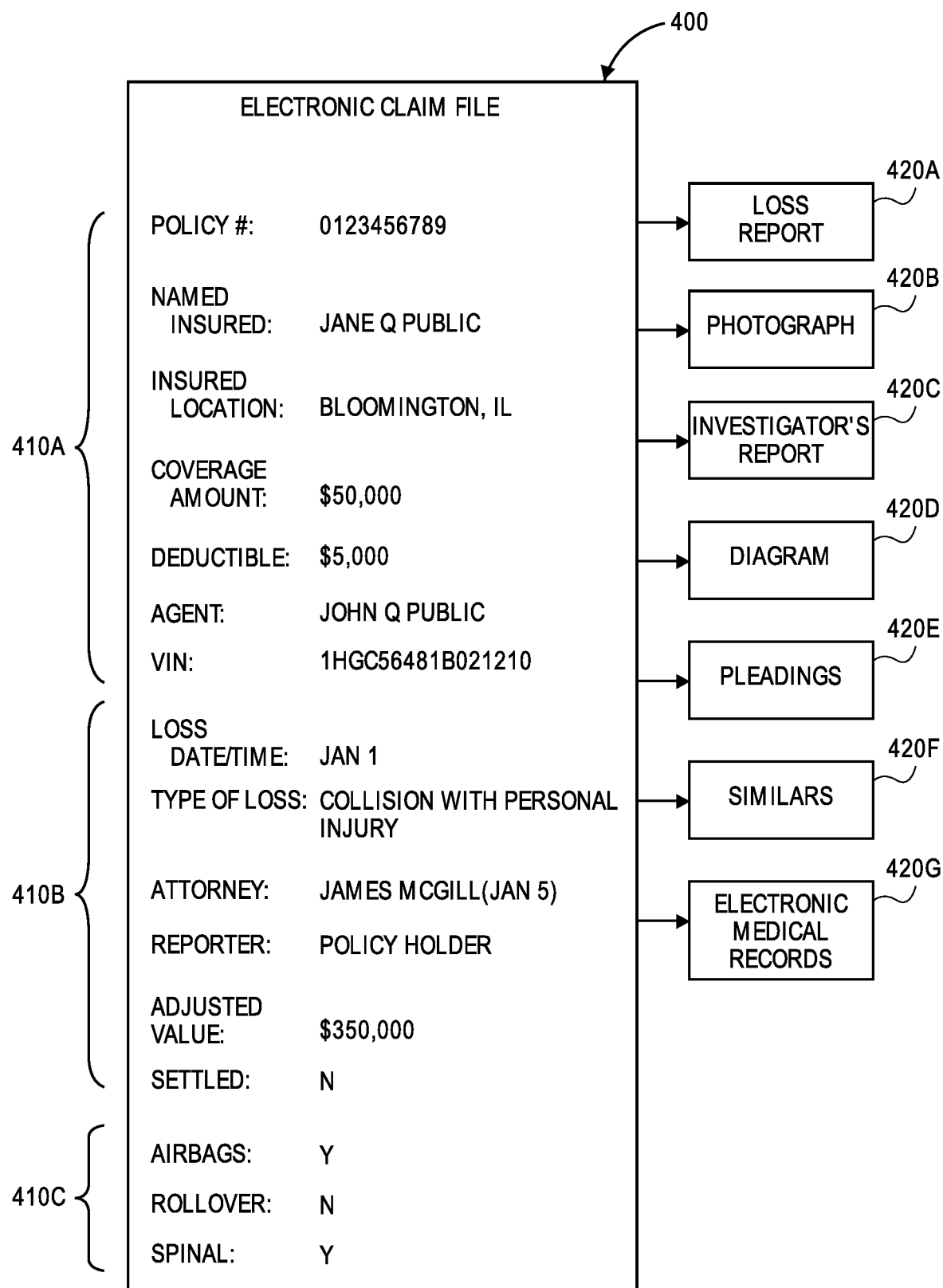
FIG. 4 depicts content of an exemplary electronic claim record that may be processed by a machine learning model, in one embodiment.

FIG. 4 depicts text-based content of an example electronic claim record 400 which may be processed using a trained ML model, such as a model trained by model training application 352 of FIG. 3. The term "text-based content" as used herein includes printing (e.g., characters A-Z and numerals 0-9), in addition to non-printing characters (e.g., whitespace, line breaks, formatting, and control characters). Text-based content may be in any suitable character encoding, such as ASCII or UTF-8 and text-based content may include HTML. Although text-based-content is depicted in the embodiment of FIG. 4, as discussed above, claim input data may include images, including hand-written notes, and the methods and systems herein may include one or more individual model trained to recognize hand-writing and to convert hand-writing to text. Further, "text-based content" may be formatted in any acceptable data format, including structured query language (SQL) tables, flat files, hierarchical data formats (e.g., XML, JSON, etc.) or as other suitable electronic objects. In some embodiments, image and audio data may be fed directly into the neural network(s) without being converted to text first.

Electronic claim record 400 may correspond to a claim in claim 210-1 through 210-$n$. With respect to FIG. 4, electronic claim record 400 includes three sections 410$a$-410$c$, which respectively represent policy information, loss information, and injury information. Policy information 410$a$ may include information about the insurance policy under which the claim has been made, including the person to whom the policy is issued, the name of the insured and any additional insureds, the location of the insured, etc. Policy information 410$a$ may be received, for example by input data collection application 314, and/or retrieved, for example, from customer data 212. Similarly, vehicle information may be included in policy information 410$a$, such as a vehicle identification number (VIN).

Additional information about the insured and the vehicle (e.g., make, model, and year of manufacture) may be obtained from data sources and joined to input data. For example, additional customer data may be obtained from customer data 212, and additional vehicle data may be obtained from a vehicle data source. In some embodiments, make and model information may be included in electronic claim record 400, vehicle attributes (e.g., the number of passengers the vehicle seats, the available options, etc.) may be queried from another system.

In addition to policy information 410$a$, electronic claim record 400 may include loss information 410$b$. Loss information generally corresponds to information regarding a loss event in which a vehicle covered by the policy listed in policy information 410$a$ sustained loss, and may be due to an accident or other peril. Loss information 410$b$ may indicate the date and time of the loss, the type of loss (e.g., whether collision, comprehensive, etc.), whether personal injury occurred, what type of personal injury occurred, whether the insured made a statement in connection with the loss, whether the loss was settled, and if so for how much money.

In some embodiments, more the than one loss may be represented in loss information 410b. For example, a single accident may give rise to multiple losses under a given policy, for example to two parties injured in a crash operated by vehicle operators not covered under the policy. In addition to loss information, electronic claim record 500 may include injury information 410c, which may include indications relating to items known to be highly correlated to severe injury such as, for example, whether airbags were deployed, whether a rollover of a vehicle occurred, and whether there was a spinal injury. It should be appreciated that many additional indicators are envisioned. External information 510c may include textual, audio, or video information. The information may include file name references, or may be file handles or addresses that represent links to other files or data sources, such as linked data 420a-g. It should be appreciated that although only links 520a-g are shown, more or fewer links may be included, in some embodiments.

Electronic claim record 500 may include links to other records, including other electronic claim records. For example, electronic claim record 500 may link to a loss report 420a, one or more photograph 420b, one or more investigator's report 420c, one or more diagram 420d, one or more legal pleading 420e, one or more similar 420f, and one or more electronic medical record 420g. Data in links 420a-420g may be ingested by, for example, the server device 304, the claim analysis engine 204, and/or the severity analysis component 104. For example, as described above, each claim may be ingested and analyzed by the trained ML model.

When a claim is received by server device 304, for example, server device 304 may include instructions that cause, for each link of link 420a-420g, all available data or a subset thereof to be retrieved. Each link may be processed according to the type of data contained therein. In some embodiments, a relevance order may be established, and processing may be completed according to that order. For example, portions of a claim that are identified as most dispositive of risk may be identified and processed first. For example, loss report 420a may be examined first, to determine whether any personal injury was reported. Alternately, the presence of legal proceedings via pleading 420e may cause a claim to be assigned to a particular tier. In one embodiment, processing of links 420a-420g may automatically abate once a confidence level with respect to the prediction of an assignment/route reaches a predetermined threshold.

Once the various input data comprising electronic claim record 400 has been processed, the results of the processing may, in one embodiment, be passed to an ML model. If the ML model that is being trained is a neural network, then neurons comprising a first input layer of the neural network may be configured so that each neuron receives particular input(s) which may correspond, in one embodiment, to one or more respective fields of policy information 410a, loss information 410b, and injury information 410c. Similarly, one or more input neurons may be configured to receive particular input(s) from links 420a-420g. In some embodiments, analysis of input entered by a user may be performed on a client device, such as client device 302. In that case, the input entered by the user may be transmitted to a server, such as server device 304, and may be passed directly as input to an already-trained ML model, such as one trained by model training application 352. In an embodiment, a component such as claim analysis engine 204 may save an indication of a tier/injury segment assignment/routing to the electronic claim file 400, as either part of information 410a-410c, or links 420a-420g.

As noted above, the methods and systems described herein may be capable of analyzing decades of electronic claim records to construct ML models, and the formatting of electronic claim records may change significantly from decade to decade, even year to year. One of the important technological achievements of the methods and systems, which addresses a long-felt need in the prior art, is the ability to quickly analyze electronic claim records in disparate formats to facilitate consumption, analysis, and comparison. As noted above, the methods and systems described herein do not suffer from fatigue, cognitive bias, or lack of experience.

Exemplary Computer-Implemented Methods

Figure 5:
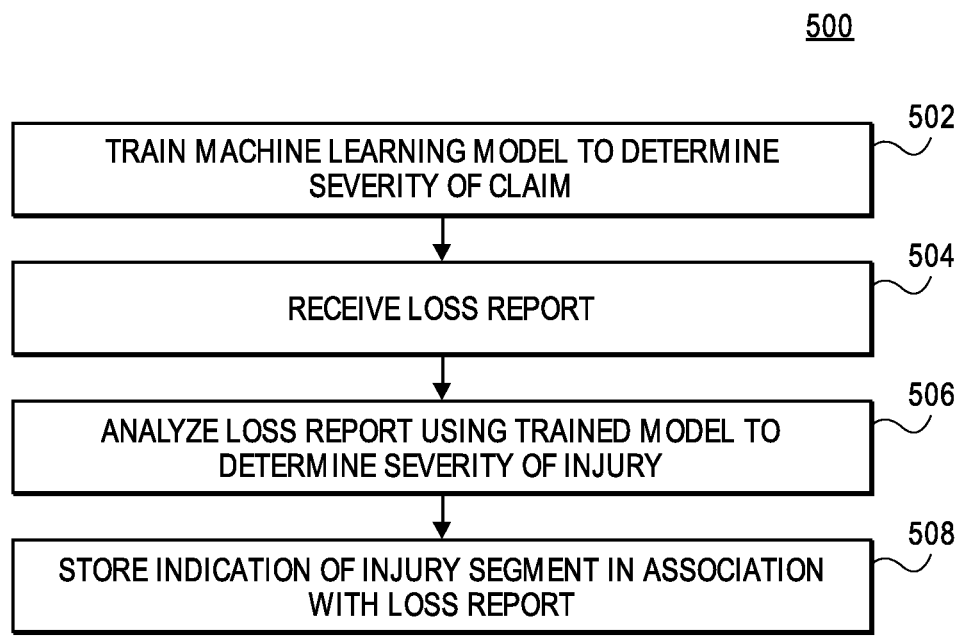
FIG. 5 depicts a flow diagram of an exemplary computer-implemented method for assigning and/or routing an auto claim to an appropriate claim handling tier to mitigate delay, according to one embodiment.

Turning to FIG. 5, an e exemplary computer-implemented method 500 for assigning and/or routing claims to a tier and/or injury segment is depicted, according to an embodiment. The method 500 may be implemented via one or more processors, sensors, servers, transceivers, and/or other computing or electronic devices. The method 500 may include training an ML model to predict the severity of an injury in of electronic vehicle claim, by analyzing historical electronic vehicle claims (block 502). The method may further include receiving a loss report (block 504). The method may further include analyzing the loss report using the trained ML model to predict a loss severity of an injury (block 506). Based on the loss severity of the injury, the method may generate a set of tiers to which the claim should be assigned and/or routed, and/or the method 500 may store an indication of the assignment and/or routing in association with the received loss report (block 508). The association may be maintained by, for example, a foreign key entry in an electronic database communicatively coupled to server device 304. An assignment may be a set of tiers that a claim is individually assigned to. On the other hand, a routing may include a set of tiers in an ordered relationship such as a list, a linked list, balanced binary tree, or any other suitably ordered data structure. Once the assignment and/or routing information is associated with the claim and/or loss report (s), a claim handler associated with a tier may retrieve a list of claims associated with a particular assignment and/or routing.

Although the present invention has been described in considerable detail with reference to certain preferred versions thereof, other versions are possible, which may include additional or fewer features. For example, additional knowledge may be obtained using identical methods. The labeling techniques described herein may be used in the identification of fraudulent claim activity. The techniques may be used in conjunction with co-insurance to determine the relative risk of pools of customers. External customer features, such as payment histories, may be taken into account in pricing risk. Therefore, the spirit and scope of the appended claims should not be limited to the description of the preferred versions described herein.

Benefits of Smart Claim Routing and Smart Claim Assignment

Without the methods and systems described herein, a claim may be assigned and/or routed to a tier/injury segment which is wholly inappropriate to handle the nature and scope of the injury present. Experienced claim analysts/handlers may work in certain tiers, and inexperienced claim analysts/handlers in others. As such, a sever claim (e.g., an accident involving a spinal injury) may be routed to a claim handler who is new to the job of claim analysis/handling and who is, predictably, unable to handle the claim professionally and to the satisfaction of the customer. The claim handler may lack the authority to settle a claim or disburse funds under a claim without review of a claim handler in another tier. That may cause delays in the processing of claims, which may run afoul of state laws regarding the timely settlement of claims. On the other hand, a claim involving trivial/minor property damage may be assigned/routed to an injury segment tier and may waste the time of the claim handler. Herein an "injury segment" may refer to one or more tiers in a flat list or in a hierarchical configuration. For example an "inpatient" injury segment may refer to a set of injury tiers relating to the handling of claims in which a loss report includes injuries requiring inpatient hospital treatment.

Reasonable claim handling wait times may be come unreasonable if claim reassignment/rerouting is necessary due to an initial error in routing/assignment. For example, two claim handling tiers a and b may each have a one-week backlog. If a claim c is erroneously assigned to tier a and is later re-assigned to tier b, but not until the claim has stalled during the one-week wait period associated with tier a, then the claim may not be considered for two weeks, instead of being considered within one week. As the number of re-assignments and/or re-routes increases, the wait time may constantly scale, resulting in wait times that may confuse and/or frustrate customers. The need to reassign/reroute claims that are incorrectly assigned/routed also wastes the time of claim handlers within the plurality of tiers. The efficiencies realized by the insurer may cause the overall claims handling process to be less expensive, which the insurer may pass along to consumers in the form of lower premiums and other discounts. The methods and systems described herein may help risk-averse customers to lower their insurance premiums by more granularly quantifying risk. The methods and systems may also allow new customers to receive more accurate pricing when they are shopping for vehicle insurance products. All of the benefits provided by the methods and systems described herein may be realized much more quickly than traditional modeling approaches. The methods and systems herein may reduce, in some cases dramatically, insurance company expenses and/or insurance customer premiums, due to increased efficiencies and improved predictive accuracies. Therefore, it is in the interest of the insurer and customers to utilize the methods and systems described herein to minimize the wait times for claim processing.

Further, the methods and systems disclosed herein may cause additional technical benefits to be realized, which may improve the functioning of computers. For example, by preventing claims to become clogged in the claims handling process, the necessary amount of hardware storage that is required to maintain claims may be reduced. For an insurer/proprietor having many hundreds of thousands of claims filed each month, computer processing resources may also be drastically reduced by preventing a large claim backlog from being built up over time.

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart or autonomous vehicle controller, desktop computer, or other device(s)). In return, the user may be entitled insurance cost savings, including insurance discounts for auto, homeowners, mobile, renters, personal articles, and/or other types of insurance. In other embodiments, deployment and use of neural network models at a user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for a system and a process of performing the methods and systems disclosed herein, using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of determining an injury segment, comprising:

training, via a processor, a machine learning model using historical claim data to determine an injury claim severity, receiving, via a processor, an auto accident loss report, analyzing the loss report using the trained machine learning model to determine a severity of an injury, determining, based on the severity of the injury, an injury segment, and storing, via a processor, an indication of the injury segment.

2. The computer-implemented method of claim 1, wherein determining, based on the severity of the injury, the injury segment includes assigning the loss report to one or more tiers.

3. The computer-implemented method of claim 2, wherein the one or more tiers are hierarchically related.

4. The computer-implemented method of claim 1, wherein determining, based on the severity of the injury, the injury segment includes assigning the loss report to one or more ordered tiers, to create a routing.

5. The computer-implemented method of claim 4, wherein the one or more ordered tiers are hierarchically related.

6. The computer-implemented method of claim 1, wherein the severity is expressed by a numeric severity level.

7. The computer-implemented method of claim 1, wherein the machine learning model is an artificial neural network.

8. The computer-implemented method of claim 1, wherein the loss report includes one or both of (i) a photograph corresponding to the accident, and (ii) a textual description corresponding to the accident.

9. The computer-implemented method of claim 1, wherein analyzing the loss report using the trained machine learning model to determine the severity of the injury includes analyzing electronic claim records corresponding to the accident.

10. The computer-implemented method of claim 9, further comprising:

analyzing vehicle telematics information.

11. A computer system configured to determine an injury segment, the system comprising one or more processors configured to:

train, via the one or more processors, a machine learning model using historical claim data to determine an injury claim severity, receive, via the one or more processors, an auto accident loss report, analyze the loss report using the trained machine learning model to determine a severity of an injury, determine, based on the severity of the injury, an injury segment, and store, via the one or more processors, an indication of the injury segment.

12. The computer system of claim 11, further configured to:

assign the loss report to one or more tiers.

13. The computer system of claim 11, further configured to:

determine a routing and route the injury claim via the routing.

14. The computer system of claim 11, wherein the machine learning model is an artificial neural network.

15. The computer system of claim 11, further configured to:

analyze vehicle telematics information.

16. A non-transitory computer readable medium containing program instructions that when executed, cause a computer to:

train, via the one or more processors, a machine learning model using historical claim data to determine an injury claim severity, receive, via the one or more processors, an auto accident loss report, analyze the loss report using the trained machine learning model to determine a severity of an injury, determine, based on the severity of the injury, an injury segment, and store, via the one or more processors, an indication of the injury segment in association with the loss report.

17. The non-transitory computer readable medium of claim 16, containing further program instructions that when executed, cause a computer to:

assign the loss report to one or more tiers.

18. The non-transitory computer readable medium of claim 16, containing further program instructions that when executed, cause a computer to:

determine a routing and route the injury claim via the routing.

19. The non-transitory computer readable medium of claim 16, containing further program instructions that when executed, cause a computer to:

analyze vehicle telematics information.

20. The non-transitory computer readable medium of claim 16, wherein the machine learning model is an artificial neural network.

* * * * *